United States Patent [19]

Sturges et al.

[11] Patent Number: 5,131,286
[45] Date of Patent: Jul. 21, 1992

[54] MECHANISM FOR ABSORBING ENERGY TRANSMITTED THROUGH A VEHICLE STEERING COLUMN

[75] Inventors: Peter Sturges, LePerray en Yvelines, France; Nicholas Henry-Moore, Northamptonshire, England

[73] Assignee: The Torrington Company, Torrington, Conn.

[21] Appl. No.: 695,097

[22] Filed: May 3, 1991

[30] Foreign Application Priority Data

May 8, 1990 [GB] United Kingdom ............ 9010304.5
Apr. 12, 1991 [GB] United Kingdom ............ 9107982.2

[51] Int. Cl.$^5$ .............................. B62D 1/18
[52] U.S. Cl. .................... 74/492; 188/371; 280/777; 74/493
[58] Field of Search ............... 74/492, 493; 188/371; 280/777

[56] References Cited

U.S. PATENT DOCUMENTS

| | | | |
|---|---|---|---|
| 3,612,223 | 10/1971 | Shiomi et al. | 74/492 X |
| 3,769,851 | 11/1973 | Edme et al. | 74/492 |
| 3,945,662 | 3/1976 | Murase et al. | 280/87 R |
| 4,194,411 | 3/1980 | Manabe et al. | 74/492 |
| 4,786,076 | 11/1988 | Wierschem | 280/777 |
| 4,943,028 | 7/1990 | Hoffman | 248/548 |
| 4,998,999 | 3/1991 | Yuzuriha et al. | 74/492 X |

FOREIGN PATENT DOCUMENTS

| | | | |
|---|---|---|---|
| 2623521 | 12/1977 | Fed. Rep. of Germany | 74/493 |
| 1-156170 | 6/1989 | Japan | 74/492 |
| 1396408 | 6/1975 | United Kingdom . | |
| 1502647 | 3/1978 | United Kingdom . | |
| 2187144 | 9/1987 | United Kingdom | 74/492 |
| 2219772A | 12/1989 | United Kingdom . | |

Primary Examiner—Allan D. Herrmann
Assistant Examiner—David W. Laub
Attorney, Agent, or Firm—John C. Bigler; Michael H. Minns

[57] ABSTRACT

A mechanism for absorbing energy transmitted through a vehicle steering column in an impact situation having a steering column support bracket which houses a clamp bolt for positionally adjusting the steering column. The bolt is located by cam/spacers which are located in a slot; a slanted slot extension is provided which has a smaller width than the diameter of the bolt. Upon impact by the driver into the steering wheel, the bolt is forced into the slot extension, thereby deforming the slot which absorbs energy as it yields.

8 Claims, 3 Drawing Sheets

MECHANISM FOR ABSORBING ENERGY TRANSMITTED THROUGH A VEHICLE STEERING COLUMN

BACKGROUND OF THE INVENTION

This invention relates generally to a mechanism for absorbing energy transmitted through a vehicle steering column in a crash or impact situation and, more particularly, to an energy absorbing mechanism for an adjustable steering column.

SUMMARY OF THE INVENTION

In one aspect of the present invention, a mechanism is provided for absorbing energy transmitted through a vehicle steering column in an impact situation, the mechanism comprising a steering column support member and a bolt arrangement coupling the steering column with the support member, while allowing means to absorb energy transmitted to the bolt arrangement from the steering column upon impact.

The foregoing and other aspects will become apparent from the following detailed description of the invention when considered in conjunction with the accompanying drawing figures.

DETAILED DESCRIPTION

Figure 1:
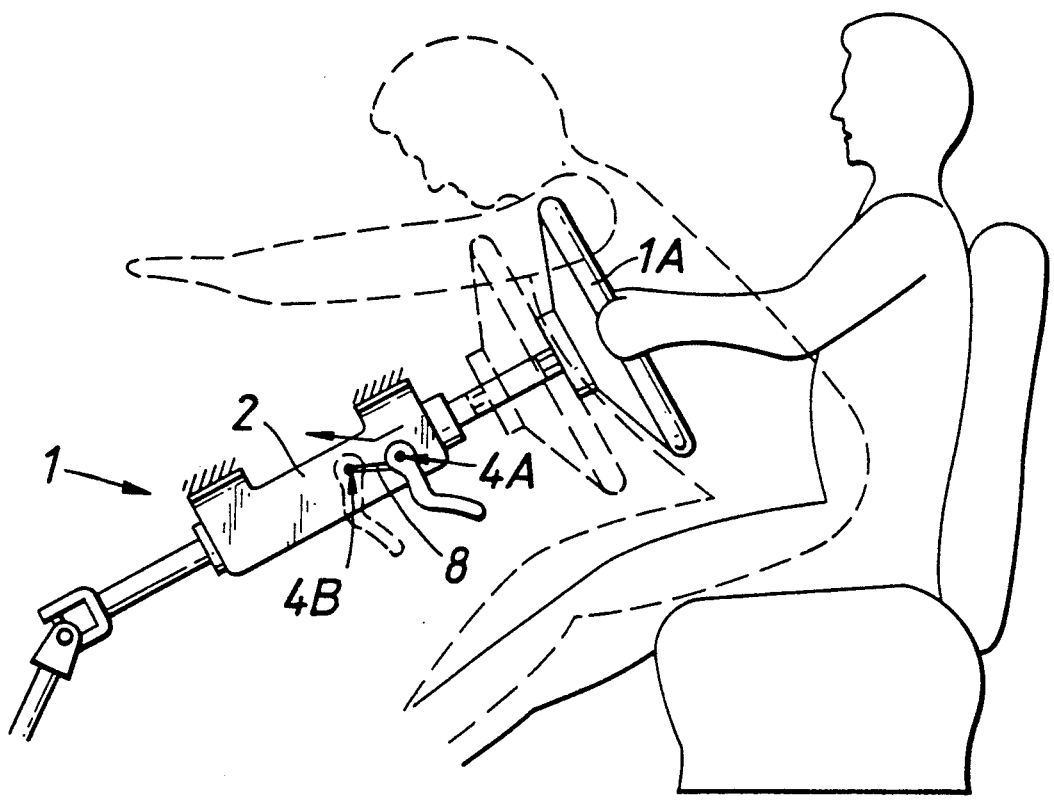
FIG. 1 is a schematic side view of a vehicle steering column with an energy absorbing mechanism according to the present invention.

Referring to the drawings, FIG. 1 illustrates a vehicle steering column 1 with steering wheel 1A. The steering column 1 is supported by a steering column support member in the form of a support bracket 2 which allows rotational movement of the column about its longitudinal axis.

Figure 2A:
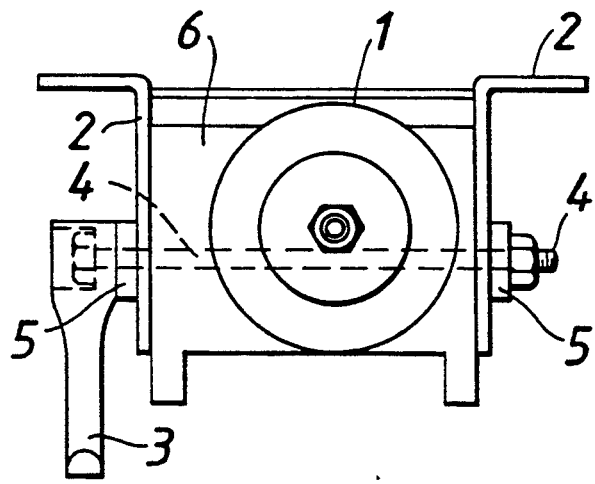
FIG. 2A is an end view of the present mechanism.

A clamp bolt arrangement is provided to allow for positional adjustment of the steering wheel 1A. The clamp bolt arrangement includes a clamp handle 3 coupled to a clamp handle bolt 4 passing through the support bracket 2. At least one, and in the embodiment shown in FIG. 2A, two plastic cam/spacers 5 are provided which serve to locate the bolt 4 in a clamping block 6. Each cam/spacer 5 is located in a respective slot 8 (FIG. 2B) in opposed walls of the support bracket 2.

Each slot 8 has an expanded aperture at the bottom end in which the cam/spacer 5 is located with slot 8 constituting an energy absorption means to absorb energy transmitted to the bolt arrangement from the steering column 1 upon impact.

The mechanism functions in this way. Normal rake/reach adjustment is achieved by unclamping the clamp handle 5 and sliding the upper end of the steering column along slot 7. This process does not absorb energy and is only a means of adjustment. When the steering column is subjected to a crash situation, the steering column telescopes due to the action of the driver imparting a large axial force on the steering wheel 1A, and the clamp block 6 is forced to the end of its travel via the slot 7. At this point, the clamp bolt 4 will be forced to travel down the slots 8. The diameter of the clamp bolt 4 is greater than the width of each slot 8 and this forces the steering column support bracket 2 to deform. The deformation of the support bracket 2 permits the energy transmitted from the steering column 1 to be absorbed.

FIG. 1 shows at 4A the location of the bolt before impact and at 4B the location of the bolt after impact.

Figure 2B:
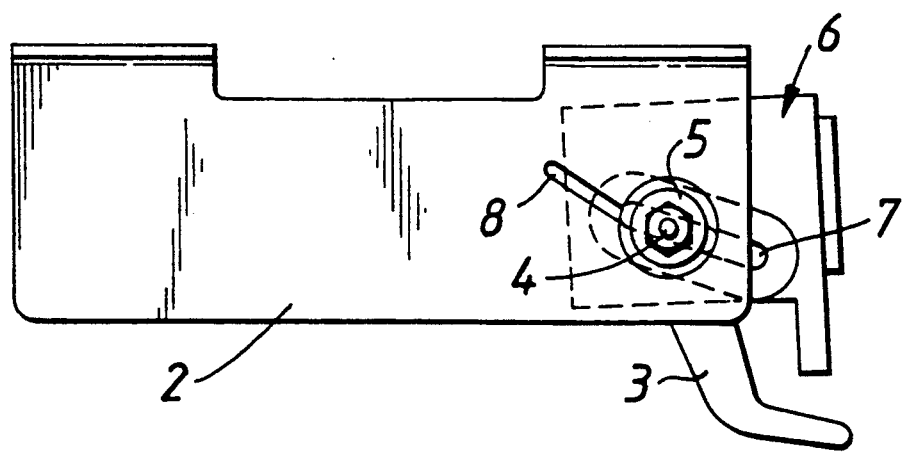
FIG. 2B a corresponding side view.
Figure 3:
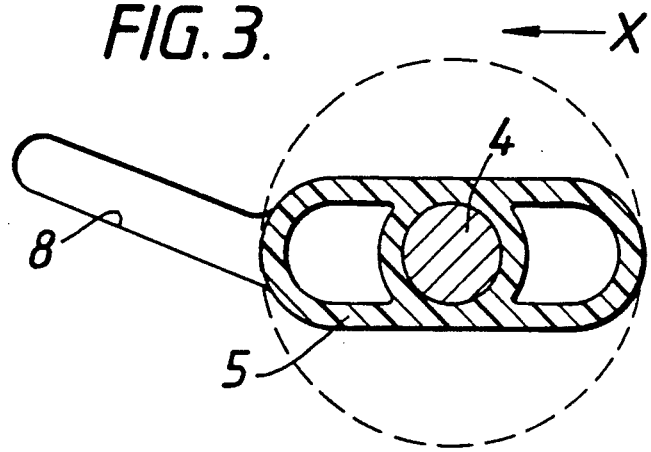
FIG. 3 is a detailed cross-sectional view of one embodiment of the present invention.

In the embodiment illustrated in FIG. 3, the energy absorption mean is the simple slot 8 just described and there is one of these one each side of the support bracket 2 (see FIG. 2B). The support bracket 2 deforms around the perimeter of the slot 8 when the bolt is forced down the slot due to chest impact of the driver. The direction of the force of this impact is indicated by the arrow X in FIGS. 3, 4, and 5. Note that the slot 8 is slanted relative to the direction of applied force.

Figure 4:
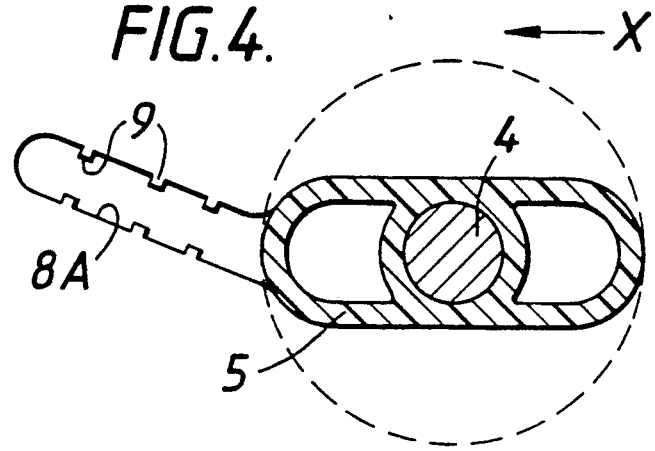
FIG. 4 is a view similar to FIG. 3 of another embodiment.

In the embodiment of FIG. 4, the or each slot 8A is provided with a plurality of opposed tangs 9 along the slot(s) which impede the movement of the sliding clamp bolt 4. The tangs, therefore, act in such a way as to absorb energy as they yield to the force.

Figure 5:
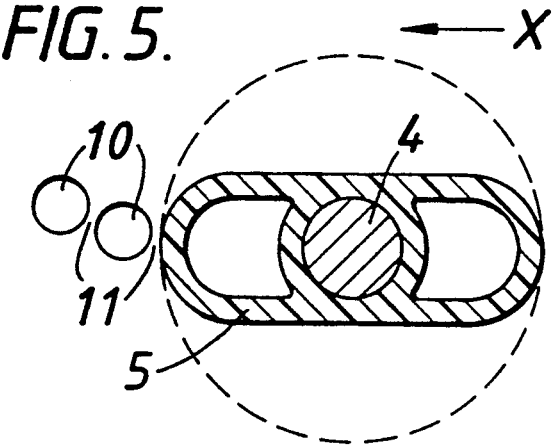
FIG. 5 a view similar to FIG. 3 of yet another embodiment.

In the embodiment shown in FIG. 5, a plurality of holes 10 are provided in a row in the walls of the bracket 2. The holes 10 are spaced closely together and are positioned in the path of the clamp bolt 4, there being only a thin wall 11 separating adjacent holes 10. As the steering column 1 collapses, the clamp bolt 4 applies a force to the thin walls 11 which separate the holes. As the thin walls yield, they absorb energy.

Having described the invention, what is claimed is:

1. A mechanism for absorbing energy transmitted through a vehicle steering column in an impact situation, the mechanism comprising:

a steering column support member:

a slot located in the steering column support member;

a bolt arrangement coupling the steering column with the support member while allowing the steering column to rotate, the bolt arrangement being located in the slot to allow the bolt arrangement to be adjusted thereby; and energy absorption means to absorb energy transmitted to the bolt arrangement from the steering column upon impact, the energy absorption means comprising an extension of the slot and the bolt arrangement including a bolt which has a diameter greater than the width of the slot extension.

2. The mechanism according to claim 1, wherein the bolt is a clamp bolt which is provided with an operating handle to adjust the position of the steering column.

3. The mechanism according to claim 1, wherein said steering column support member comprises a support bracket in which said bolt arrangement is mounted.

4. The mechanism according to claim 1, wherein at least one cam/spacer is provided to locate the bolt arrangement in said steering column support member.

5. The mechanism according to claim 4, wherein said at least one cam/spacer is located in the slot of the steering column support member to allow the bolt arrangement to be adjusted thereby.

6. The mechanism according to claim 1, wherein said steering column support member comprises a support bracket having two walls and wherein each wall includes a said slot extension.

7. The mechanism according to claim 1, wherein said slot extension is provided with tangs which are arranged to yield to the bolt as it is forced along the slot extension, thereby absorbing energy.

8. The mechanism according to claim 1, wherein said slot extension comprises a row of holes separated by thin walls so arranged that an application of force by the bolt on the thin walls separating the holes causes the thin walls to yield and absorb energy.

* * * * *